(12) United States Patent
Lalithsena et al.

(10) Patent No.: US 11,430,426 B2
(45) Date of Patent: Aug. 30, 2022

(54) RELEVANT DOCUMENT RETRIEVAL TO ASSIST AGENT IN REAL TIME CUSTOMER CARE CONVERSATIONS

(71) Applicant: International Business Machines Corporation, Armonk, NY (US)

(72) Inventors: Rupaningal Sarasi Sarangi Lalithsena, San Jose, CA (US); Jalal Mahmud, San Jose, CA (US); Rama Kalyani T. Akkiraju, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 16/837,491

(22) Filed: Apr. 1, 2020

(65) Prior Publication Data

US 2021/0312900 A1 Oct. 7, 2021

(51) Int. Cl.
| | |
|---|---|
| *G10L 15/08* | (2006.01) |
| *G10L 15/02* | (2006.01) |
| *G06F 16/93* | (2019.01) |
| *G06Q 30/00* | (2012.01) |
| *G06N 5/04* | (2006.01) |

(Continued)

(52) U.S. Cl.
CPC .............. *G10L 15/02* (2013.01); *G06F 16/93* (2019.01); *G06N 5/043* (2013.01); *G06N 20/00* (2019.01); *G06Q 30/016* (2013.01); *G10L 25/63* (2013.01); *G10L 2015/085* (2013.01); *G10L 2015/088* (2013.01)

(58) Field of Classification Search
None
See application file for complete search history.

(56) References Cited

U.S. PATENT DOCUMENTS

| 9,645,994 B2 | 5/2017 | Agarwal et al. |
| 10,152,972 B1 | 12/2018 | Thomas et al. |
| 10,345,677 B1 | 7/2019 | Wurmfeld |

(Continued)

OTHER PUBLICATIONS

Andolina, Salvatore, et al., "Investigating Proactive Search Support In Conversations", ACM Conf. on Designing Interactive Systems, pp. 1295-1307 (2018).

(Continued)

*Primary Examiner* — Nafiz E Hoque
(74) *Attorney, Agent, or Firm* — Aaron N. Pontikos

(57) ABSTRACT

An enhanced information retrieval system takes a customer utterance and constructs a contextually-enriched content-based query allowing the system to retrieve the most relevant documents to assist an agent in a real-time conversation with the customer. Phrases in the utterance are classified as informational or non-informational using a machine learning system trained with phrases from prior conversations of multiple users. Content phrases are extracted from the informational phrases using keyword extraction (ranking noun phrases), intent/action extraction (semantic role labeling), and topic label extraction (clustering of historical logs). Emotional content is identified using a sequence tagging model and removed. Contextual information from prior conversations with this user is combined with the updated content phrases to create the contextually-enhanced content-based query, which can then be submitted to the information retrieval system.

18 Claims, 6 Drawing Sheets

(51) Int. Cl.
  *G10L 25/63* (2013.01)
  *G06N 20/00* (2019.01)

(56) References Cited

U.S. PATENT DOCUMENTS

| | | | |
|---|---|---|---|
| 10,387,573 | B2 | 8/2019 | Raanani et al. |
| 10,423,665 | B2 | 9/2019 | Gupta et al. |
| 10,424,319 | B2 | 9/2019 | Akkiraju et al. |
| 2016/0247165 | A1* | 8/2016 | Ryabchun .......... G06Q 30/0201 |
| 2017/0032027 | A1* | 2/2017 | Mauro ................ H04M 3/5191 |
| 2018/0144738 | A1 | 5/2018 | Vasavur et al. |
| 2018/0218750 | A1 | 8/2018 | Nichkawde et al. |
| 2018/0260445 | A1 | 9/2018 | Aravamudan et al. |
| 2018/0359361 | A1 | 12/2018 | Kannan et al. |
| 2019/0236140 | A1 | 8/2019 | Canim et al. |
| 2019/0304459 | A1 | 10/2019 | Howard et al. |
| 2019/0318004 | A1* | 10/2019 | Rohatgi .................. G06F 16/93 |
| 2021/0036973 | A1* | 2/2021 | Venkateshwaran .......................... H04L 41/5074 |
| 2021/0136205 | A1* | 5/2021 | Adibi ..................... G06N 20/00 |

OTHER PUBLICATIONS

Baeza-Yates, Ricardo, et al., Modern Information Retrieval, Chapter 10 "User Interfaces and Visualization", pp. 257-324, ACM Press (1999).

Bartl, Alexander, et al., "A Retrieval-Based Dialogue System Utilizing Utterance And Context Embeddings", Cornell University Library, arXiv:1710.05780v3, pp. 1-8 (2017).

Carpineto, Claudio, et al., "A Survey of Automatic Query Expansion in Information Retrieval", ACM Computing Surveys, v. 44, n. 1 (2012).

Gildea, Daniel, "Automatic Labeling of Semantic Roles", Ass'n. for Computational Linguistics, v. 28, n. 3, pp. 245-288 (2002).

Kim, Su Nam, et al., "Classifying Dialogue Acts in One-on-one Live Chats", Proc. Conf. on Empirical Methods in Natural Language Processing, pp. 862-871 (2010).

Kumaran, Giridhar, et al., "Adapting information retrieval sysems to user queries", Information Processing & Management, v. 44, n. 6, pp. 1838-1862 (2008).

Liu, Xiaoyu, et al., "Generating Keyword Queries for Natural Language Queries to Alleviate Lexical Chasm Problem." Proc. ACM Int'l. Conf. on Information and Knowledge Management (2018).

Mihalcea, Rada, et al., "TextRank: Bringing Order into Texts", Proc. Conf. on Empirical Methods in Natural Language Processing (2004).

Nambiar, Ullas, et al., "Discovering Customer Intent In Real-time for Streamlining Service Desk Conversations", Proc. ACM Int'l. Conf. on Information and Knowledge Management, pp. 1383-1388 (2011).

Oraby, Shereen, et al., "'How May I Help You?': Modeling Twitter Cusomer Service Conversations Using Fine-Grained Dialogue Acts", Proc. Int'l. Conf. on Intelligent User Interfaces (2017).

Phan, Duc-Anh, et al., "Multiple Emotions Detection In Conversation Transcripts", Pacific Asia Conf. On Language, Information and Computation, pp. 85-94 (2016).

Riezler, Stefan, et al., "Statistical Machine Translation for Query Expansion in Answer Retrieval", Proc. Ass'n. of Computational Linguisics, pp. 464-471 (2007).

Singhal, Amit, "Modern Information Retrieval: A Brief Overview", IEEE Data Engineering Bulletin v. 24, n. 4, pp. 35-43 (2001).

Wikipedia, "PageRank" [online], retrieved on Mar. 25, 2020 from the Internet URL: https://en.wikipedia.org/wiki/PageRank (2020).

Yan, Zhao, et al., "DocChat: An Information Retrieval Approach for Chatbot Engines Using Unstructured Documents" Proc. Ass'n. for Computational Linguisics, pp. 516-525 (2016).

Zukerman, Ingrid, et al., "Lexical Query Paraphrasing for Document Retrieval", Proc. Int'l. Conf. on Computational Linguisics, pp. 1177-1183 (2002).

* cited by examiner

RELEVANT DOCUMENT RETRIEVAL TO ASSIST AGENT IN REAL TIME CUSTOMER CARE CONVERSATIONS

BACKGROUND OF THE INVENTION

Field of the Invention

The present invention generally relates to information retrieval, and more particularly to a method of retrieving relevant documents from a reference collection to assist an agent helping a customer.

Description of the Related Art

Having the right amount of relevant information is critical for an agent to provide satisfactory answers to customer queries in real-time conversations. With the rapid growth of information, it is challenging for an agent to be an expert and up-to-date in all possible areas where customers may need help. Typically, this information resides in a large document collection that is too extensive to allow the agent to be familiar with all of the content. Hence, extracting the relevant documents containing the information that can assist the agent will greatly help increase the agent's productivity.

Relevant document retrieval for a given query is a well-studied problem in the field of information retrieval. Much of this work involves analysis of a user query using natural language processing. Natural language processing (NLP) is a field of computer science, artificial intelligence, and linguistics concerned with the interactions between computers and human (natural) languages. Many challenges in NLP involve natural language understanding, that is, enabling computers to derive meaning from human or natural language input, and others involve natural language generation allowing computers to respond in a manner familiar to a user. For example, a non-technical person may input a natural language question to a computer system, and the system intelligence can provide a natural language answer which the user can hopefully understand. Examples of an advanced computer systems that use natural language processing include virtual assistants, Internet search engines, and deep question answering systems such as the Watson™ cognitive technology marketed by International Business Machines Corp.

Recent improvements in information retrieval systems have focused on the importance of modifying the user's original query in an attempt to retrieve better results from the reference documents. Original user queries can often contain complex information or alternatively are too short to be effectively handled by the information retrieval systems. In order to address these issues, there are number of approaches taken to modify the query including query paraphrasing and query expansion. More recent approaches use encoder decoder models by considering the query modification as a translation problem to convert natural language queries into keyword queries for web search engines.

Another area where related work is ongoing involves chatbots. A chatbot is a computer program that conducts a conversation with a human user, and is often designed to convincingly simulate how a human would behave as a conversational partner. Chatbot engines can exploit the informational retrieval approach to find the answer to a customer's query.

SUMMARY OF THE INVENTION

The present invention in at least one embodiment is generally directed to a method of enhanced document retrieval for an agent in a real-time conversation with a customer by receiving a plurality of customer utterances from the customer during the real-time conversation, classifying each of the customer utterances as either informational phrases or non-informational phrases, extracting content phrases from the informational phrases, determining contextual information related to a current context of the real-time conversation, combining the contextual information with the content phrases to create a contextually-enhanced content-based query, submitting the contextually-enhanced content-based query to an information retrieval system, and providing one or more documents from the information retrieval system to the agent responsive to the contextually-enhanced content-based query. Emotional content in the informational phrases can be identified using a sequence tagging model, and the informational phrases later updated by removing the emotional content. The customer utterances can be classified using a cognitive system based on phrases from prior conversations of multiple users. In the preferred implementation the content phrases are extracted using keyword extraction (ranking noun phrases), intent/action extraction (semantic role labeling), and topic label extraction (clustering of historical logs). The contextual information can be determined by identifying query phrases associated with an earlier conversation between the agent and the customer.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

DESCRIPTION OF THE PREFERRED EMBODIMENT(S)

Query modification has proven useful at improving information retrieval systems, but there are still significant limitations to current approaches. One limitation pertains to the context of a current query. For example, most chatbot approaches modify a query based only on the last user statement, without capturing any previous elements of the interaction, or earlier interactions with the same user. This can be particularly challenging when trying to assist an agent in a real-time customer conversation. This situation is different from the traditional query reformulation techniques as the query itself is part of the conversation in this case.

It would, therefore, be desirable to devise an improved method of modifying a statement of a customer in a real-time conversation with an agent. It would be further advantageous if the method could allow an information retrieval system to more accurately pull relevant documents from a reference collection. These and other advantages are achieved in various implementations of the present invention by analyzing a conversation structure to separate out informational versus non-informational phrases. This structure helps to eliminate the utterances that are not worth sending to the information retrieval system. Query phrases can be extracted from the informational phrases. This content-based phrase detection can be further improved by identifying entities, intent, and topics from the utterances. Emotional content can further be filtered out. Extraction of the emotional phrases can be carried out using sequence tagging models to identify the content sequences. Prior conversations with the same user are then leveraged to determine a context for the current query, and the query is contextually enriched before submission to the information retrieval system to extract the most relevant results.

Figure 1:
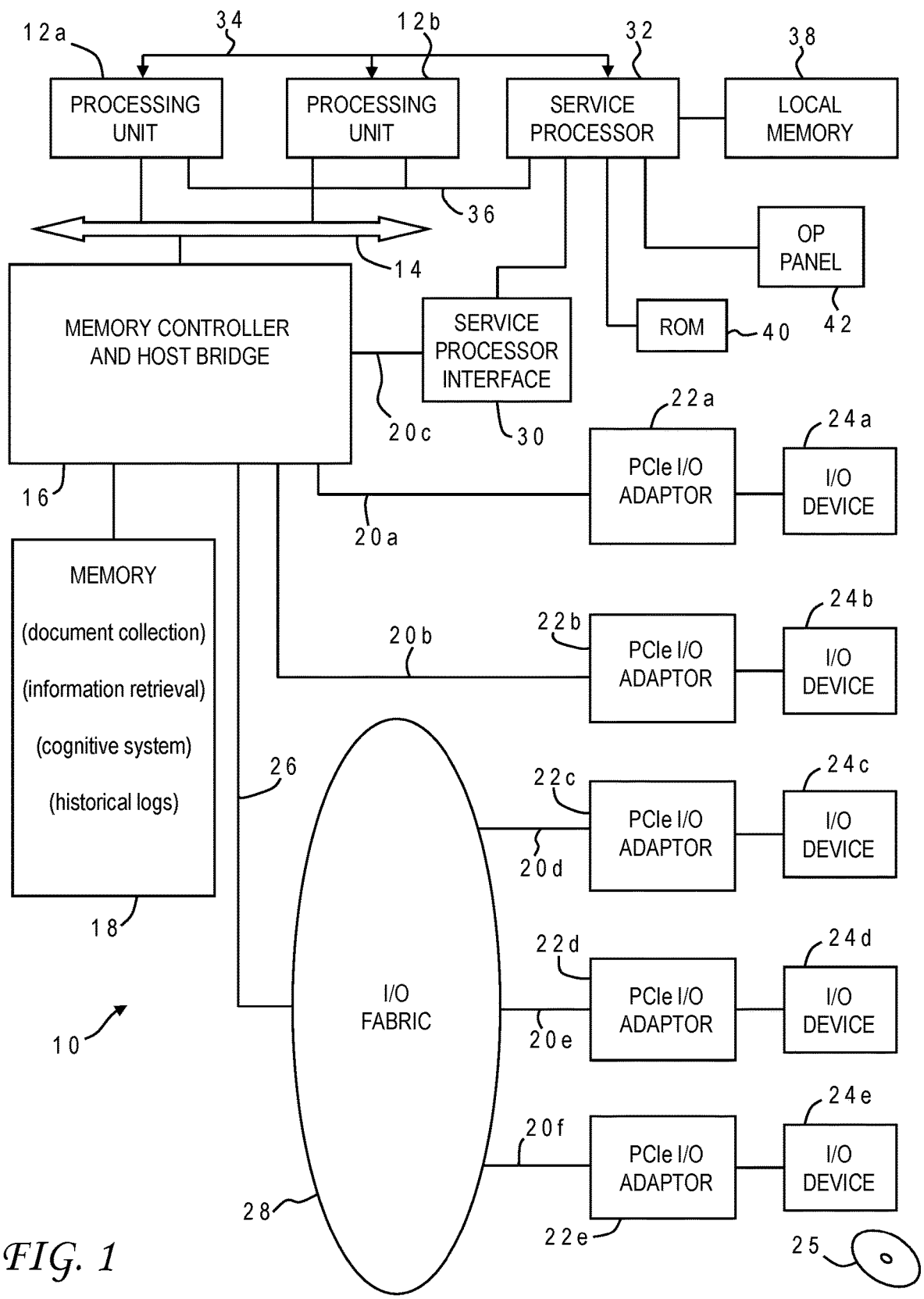
FIG. 1 is a block diagram of a computer system programmed to carry out enhanced document retrieval for an agent in a real-time conversation in accordance with one implementation of the present invention.

With reference now to the figures, and in particular with reference to FIG. 1, there is depicted one embodiment 10 of a computer system in which the present invention may be implemented to carry out enhanced information retrieval using contextually-enriched content-based queries. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein one or more applications or modules in accordance with the present invention, including an information retrieval system, and document collection for that system, a cognitive system for analyzing user utterances, and historical logs of prior user conversations.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the enhanced information retrieval application of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

The present invention may be a system, a method, and/or a computer program product. The computer program product may include one or more computer readable storage media collectively having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for an enhanced information retrieval process that uses novel analysis techniques to transform user utterances into actionable queries. Accordingly, a program embodying the invention may additionally include conventional aspects of various information retrieval tools and natural language processing tools, and these details will become apparent to those skilled in the art upon reference to this disclosure.

Figure 2:
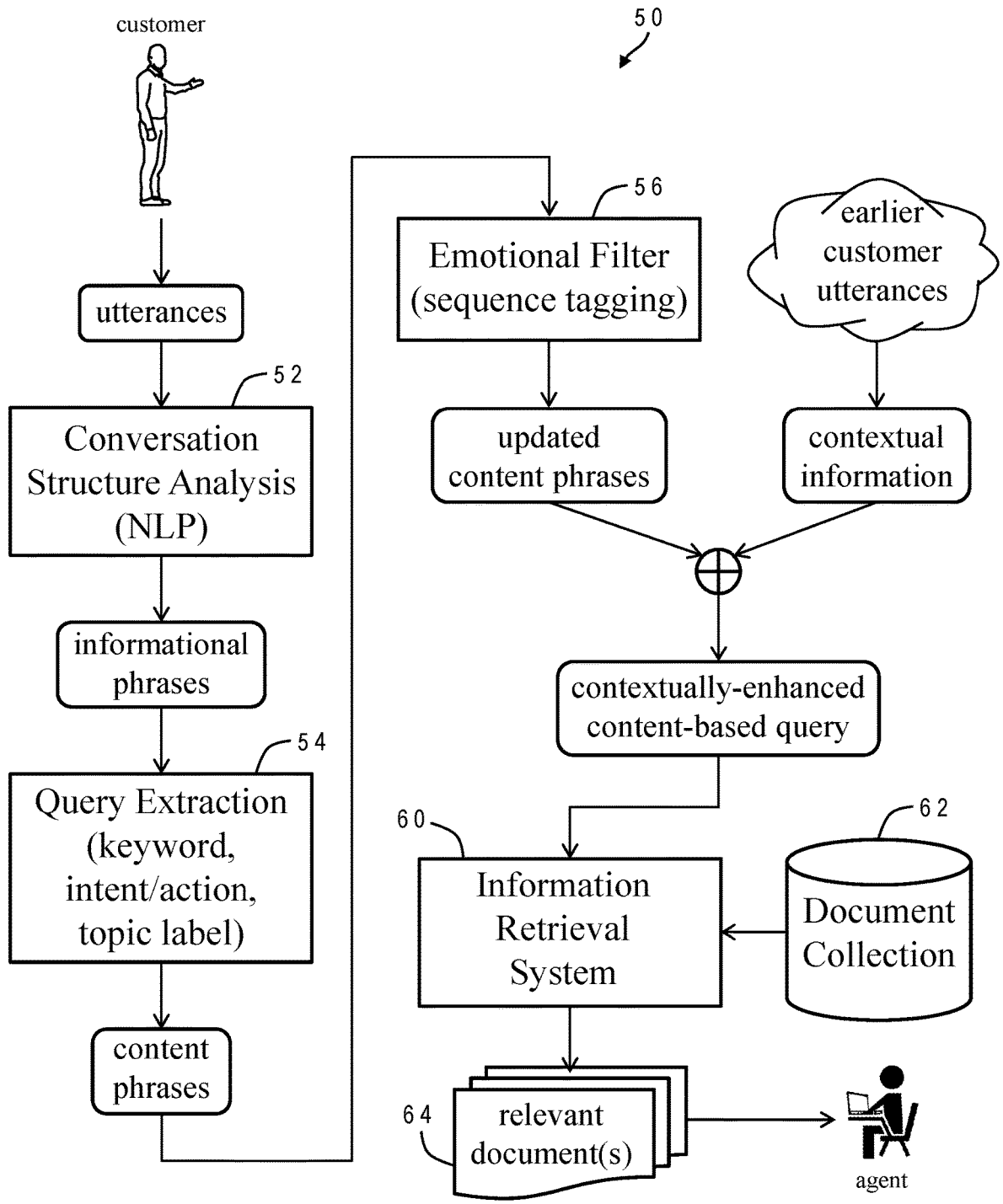
FIG. 2 is a high-level pictorial representation of an enhanced document retrieval environment in accordance with one implementation of the present invention.

Referring now to FIG. 2, there is depicted a high-level pictorial representation of an enhanced document retrieval environment 50 in accordance with one implementation of the present invention. Document retrieval environment 50 is adapted for use by an agent assisting a customer in a real-time conversation. Document retrieval environment 50 includes a conversation structure analysis module 52, a query extraction module 54, an emotional filter module 56, and an information retrieval system 60 which accesses a document collection 62. Conversation structure analysis module 50 analyzes utterances from the customer in real-time, that is, while the conversation with the agent is still ongoing, and can accordingly be updated with each customer input. The term "real-time" as used herein denotes the actual period of time during which the conversation occurs, with there being practically no delay.

Understanding the structure of the conversation can be formulated as a sequence classification problem where a model classifies each conversation to a set of predefined classes on-the-fly. Different approaches can be used by conversation structure analysis module 52 to carry out this classification. One suitable approach is the dialogue acts described in the paper "How May I Help You?: Modeling Twitter Customer Service Conversations Using Fine-Grained Dialogue Acts" by Shereen Oraby et al. (Proc. ACM Int'l. Conf. on Intelligent User Interfaces, 2017). Dialogue acts consists of a taxonomy that describes the nature of each utterance and a method to classify each utterance to the taxonomy. This approach helps identify whether the customer's current utterance is, for example, a request for help, a request for information, an open question, or merely a social act such as a thanks, an apology, a greeting, small talk, or a down player (a backwards-linking label often used after "thanks" to down play the contribution, e.g. "You are welcome, my pleasure").

By analyzing these various acts, a system can learn rules to discard the utterances that are not query worthy for information. For example, a simple rule would be to discard all customer utterances with only social act and greeting. This analysis may be assisted by the use of a cognitive system as described further below in conjunction with FIG. 3. In the exemplary implementation, the cognitive system generally classifies customer utterances as either informational (worthy of query) or non-information (not worthy of query). Non-informational phrases are discarded, and informational phrases are passed to query extraction module 54.

Query extraction module 54 may use a number of techniques to extract query phrases from the conversation. In the illustrative embodiment these techniques include keyword extraction, action (intent) extraction, and topic label extraction using natural language processing capabilities. Keyword extraction refers to finding keywords in the utterance, i.e., important noun phrases in the query. Keyword extraction leverages the syntactic structure of the utterance to identify the important noun phrases and then rank these noun phrases using a PageRank ranking algorithm. The PageRank algorithm is a graph-based ranking algorithm that ranks vertices in the graph by considering each vertex's relative importance with respect to the other vertices. Keyword extraction first extracts the noun phrases given a document and treats these noun phrases as the vertices in the graph.

As keyword-only extraction focuses on noun phrases, it will lose out on important verb phrases such as "reset", "charge" or "setup". In order to address this gap, the present invention can exploit the semantic features of the sentences such as semantic role labeling to extract the intent/action from the user utterance. Semantic role labeling is known in the art, and analyzes the grammatical structure of the sentence to extract various elements in the sentence which is helpful for various NLP tasks. For example, given the utterance "Can you help me to setup the voice command?", it will detect "setup" as the predicate/action and "voice command" as the object/theme. While keyword extraction algorithm can detect the voice command, it would not detect the verb/action.

Topic labeling approaches can also be used to extract the topic of a conversation. Once historical conversation logs of similar conversations from the domain have been collected (for this or other users), clustering-based techniques can be employed to identify a diverse number of topics and then infer the topic label of the current utterance. This technique clusters the prior conversation with the notation that similar utterances will place it in a single cluster, and then for each of these clusters it identifies a representative phrase(s) to denote the cluster. Given these representative phrases for prior conversations, now when a new utterance comes the system can assign this new utterance to one of these clusters and use the representative query phrase which were assigned to this cluster before. These topic labels have the advantage of containing both noun phrases and verb phrases and also being specific the domain. Since topic labels depend on the historical conversational logs, they are seen as another way to supplement the query extraction but are limited. Together with the keyword and intent/action extraction, these three approaches lead to a more comprehensive result.

The content phrases from query extraction module 54 may still include expressions that are not particularly helpful in forming a query, particularly emotional statements that express positive or negative sentiment such as disappointment, disgust, anger, excitement or joy. Sending these phrases to the information retrieval engine can result in returning irrelevant document. Emotional filter 56 can accordingly be used to remove such emotional content from the conversation. There are numerous conventional techniques for flagging emotional content in a natural language statement. In the exemplary embodiment, emotional filter 56 models this task as a sequence tagging problem where the objective is to identify the emotional phrases from the utterance. Sequence tagging model tags each token in a sentence. This technique is heavily used in NLP for named entity recognition (NER). In NER, the sequence tagging model tags each token in the sentence as a beginning of the entity type, a middle of the entity type, an end of the entity type, or other (no any entity type). These models learn by looking at the tags provided in training data, i.e., employing another cognitive system. By applying the same idea here, emotional filter 56 discerns tags that begin an emotion phrase, are in the middle of the emotion phrase, are at the end of the emotion phrase, or other. Thus, removing emotional content could mean removing an entire sentence or just a piece of a sentence. These phrases are discarded to update the content-based phrases from the utterance.

As the conversation is a flow of communication, just considering a single utterance is often not enough to understand the full context of the customer's information needs. For an example, a customer may have described the product that he is having trouble with in a previous conversation while describing the problem later in the current conversation. For the query to be informative, it is important to add the relevant context. The naïve approach for this augmentation will be to combine all prior query phrases to the current query phrase by assuming that the conversation will be on the same topics. However, in certain cases the customer may require help on a different matter. So the same topic clustering approach introduced above can be used to detect whether the context of the conversation has changed or not. If the current utterance belongs to the same topic cluster as before, all of the prior query phrases attached to it are combined with the current updated content phrases. If it belongs to a different cluster, then only the query phrases from the current utterance are sent.

Combining this contextual information with the updated content phrases leads to a contextually-enhanced content-based query which can then be submitted to the information retrieval system 60. Information retrieval system uses this final query form to locate the most relevant documents 64 in document collection 62 which are provided to the agent in real-time.

As noted above, the present invention in some implementations relies on a cognitive system to distinguish certain phrases in the customer utterance. Cognitive systems are known in the art. A cognitive system (sometimes referred to as deep learning, deep thought, or deep question answering) is a form of artificial intelligence that uses machine learning and problem solving. Cognitive systems often employ neural networks although alternative designs exist. The neural network may be of various types. A feedforward neural network is an artificial neural network wherein connections between the units do not form a cycle. The feedforward neural network was the first and simplest type of artificial neural network devised. In this network, the information moves in only one direction, forward, from the input nodes, through the hidden nodes (if any) and to the output nodes. There are no cycles or loops in the network. As such, it is different from recurrent neural networks. A recurrent neural network is a class of artificial neural network where connections between units form a directed cycle. This creates an internal state of the network which allows it to exhibit dynamic temporal behavior. Unlike feedforward neural networks, recurrent neural networks can use their internal memory to process arbitrary sequences of inputs. A convolution neural network is a specific type of feed-forward neural network based on animal visual perception, and so is particularly useful in processing image data. Convolutional neural networks are similar to ordinary neural networks but are made up of neurons that have learnable weights and biases.

There are many alternatives to the use of neural networks for machine learning, such as a support vector machine (SVM). An SVM basically constructs a multidimensional mathematical space based on training examples, and provides a boundary in that space that allows for binary classification of an input, e.g., as a "good" answer versus a "bad" answer. Another approach involves Bayesian networks which represent a set of variables with a directed acyclic graph. The network is then used to compute probabilistic relationships between the variables. A cognitive system is not limited to use of a single approach, i.e., it can incorporate any number of these machine learning algorithms.

A modern implementation of artificial intelligence is the IBM Watson™ cognitive technology, which applies advanced natural language processing, information retrieval, knowledge representation, automated reasoning, and machine learning technologies to the field of open domain question answering. Such cognitive systems can rely on existing documents (corpora) and analyze them in various ways in order to extract answers relevant to a query, such as person, location, organization, and particular objects, or identify positive and negative sentiment. Different techniques can be used to analyze natural language, identify sources, find and generate hypotheses, find and score evidence, and merge and rank hypotheses. Models for scoring and ranking the answer can be trained on the basis of large sets of question (input) and answer (output) pairs. The more algorithms that find the same answer independently, the more likely that answer is correct, resulting in an overall score or confidence level.

Figure 3:
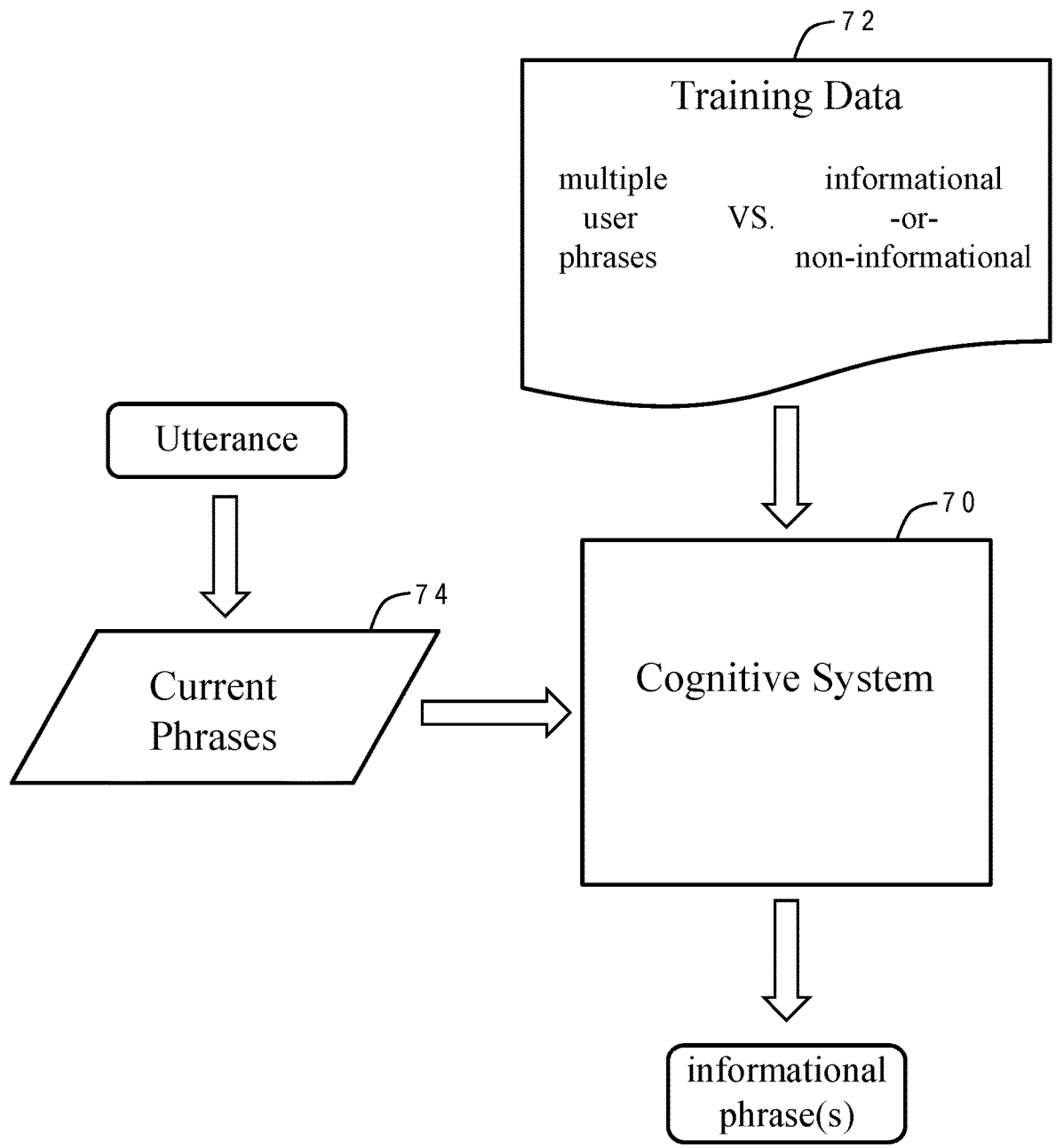
FIG. 3 is a block diagram showing training of a cognitive system to allow classification of user utterances as informational or non-informational in accordance with one implementation of the present invention.

As seen in FIG. 3, one such cognitive system 70 can be trained to provide an initial culling of phrases from the original customer utterances. Cognitive system 70 is trained using data 72 representing previous or known user phrases from multiple users. The training may be supervised or unsupervised. In this example, each of the input phrases is deemed either informational or non-informational, i.e., cognitive system 70 provides binary classification. For example, phrases such as "thank you", "hello", or "I need help" are considered non-informational as they pertain to social interaction or are generic as opposed to phrases having specific subjects of interest. Once so trained, cognitive system can be applied to phrases 74 found in the current conversation. The current phrases 74 are extracted from the customer utterance using conventional NLP techniques. Cognitive system 70 thereby outputs one or more informational phrases for further processing by the enhanced information retrieval system.

Figure 4:
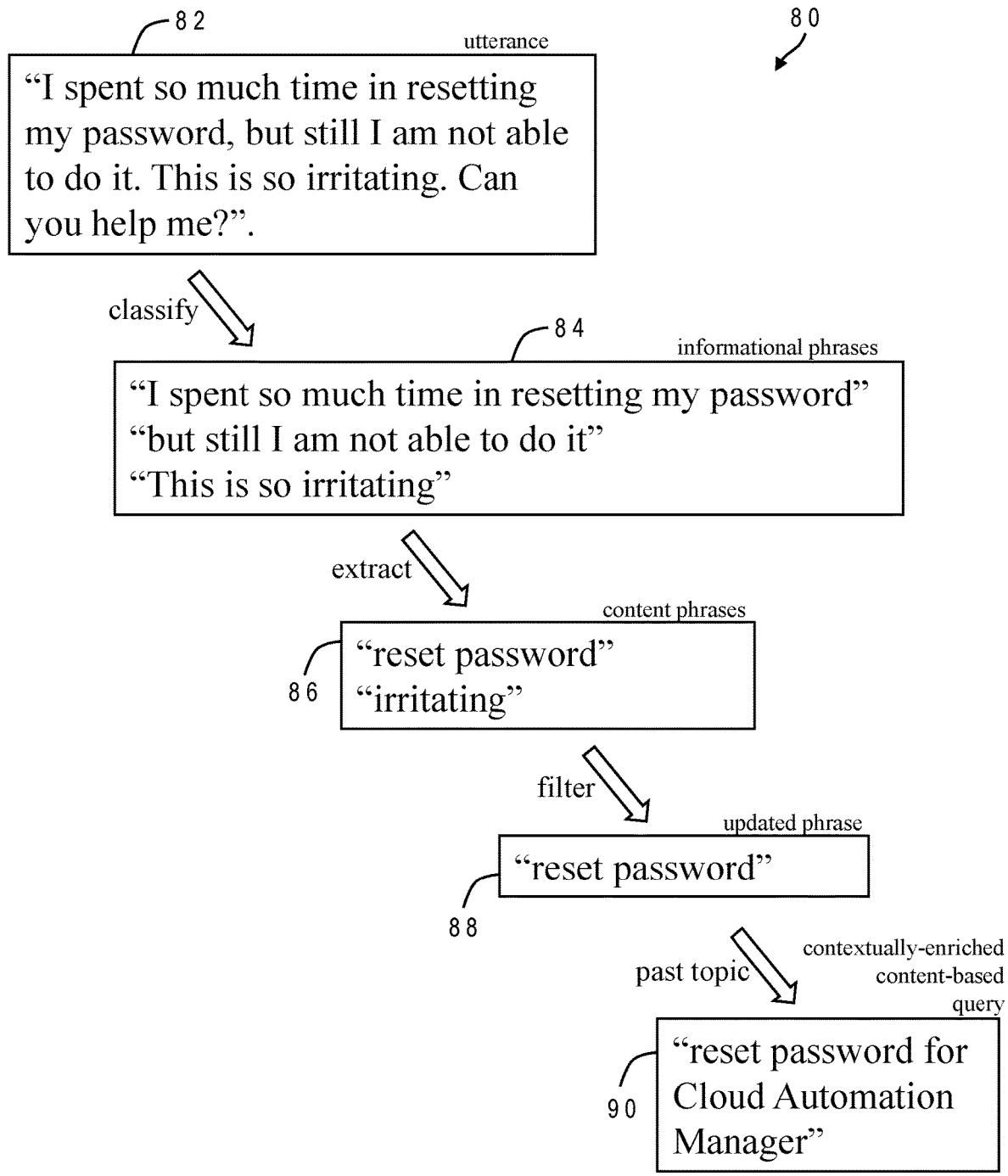
FIG. 4 is a pictorial representation of the evolution of a user utterance into a contextually-enhanced content-based query in accordance with one implementation of the present invention.

FIG. 4 shows a progression 80 of how a specific customer utterance 82 can be analyzed and modified to generate a contextually-enhanced content-based query. In this example, the original utterance 82 is "I spent so much time in resetting my password, but still I am not able to do it. This is so irritating. Can you help me?" Using cognitive system 70, conversation structure analysis module 52 first separates out non-informational phrases from utterance 82, leaving the informational phrases 84 which include "I spent so much time in resetting my password", "still I am not able to do it", and "This is so irritating". Query extraction module 54 examines each of these information phrases and generates candidate content phrases 86, in this case "reset password" and "irritating". Emotional filter 56 removes the "irritating" phrase, providing an updated content phrase 88 "reset password". While this updated phrase could be submitted to the information retrieval system as a query, it is still unclear which product the customer is talking about. The enhanced query system accordingly looks to see if there is any contextual information available from previous conversations with this customer. For this example, the previous topic of conversation from this customer pertains to a product known as "Cloud Automation Manager." This contextual information is added to the updated content phrase to result in a contextually-enhanced content-based query 90, "reset password for Cloud Automation Manager", which is then submitted to information retrieval system 60.

Figure 5:
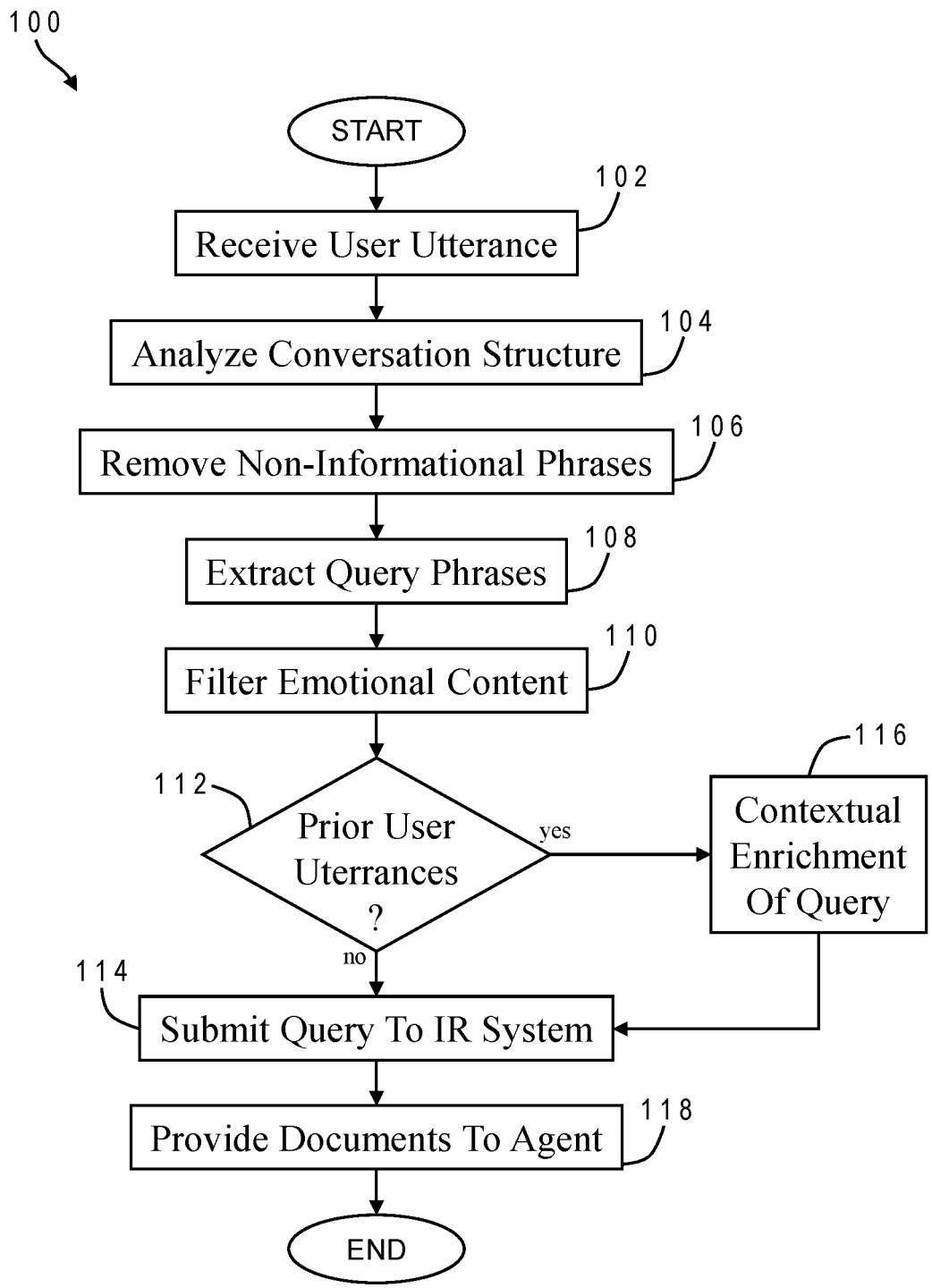
FIG. 5 is a chart illustrating the logical flow for an enhanced document retrieval process in accordance with one implementation of the present invention.

The present invention may be further understood with reference to the chart of FIG. 5 which illustrates the logical flow for an enhanced document retrieval process 100 in accordance with one implementation of the present invention. Process 100 begins by receiving the current user utterance 102. This interaction may be performed via any convenient user interface such as a keyboard employed as part of a client workstation used by the user, or a microphone combined with voice recognition technology that converts a spoken utterance into a text format. The current user utterance undergoes conversation structure analysis 104 to understand the phrases within the utterance. As noted above, this step can involve different methodologies such as dialogue acts modeling. The process then removes any non-informational phrases from the utterance 106. Next, candidate query phrases are extracted from the remaining informational phrases 108. The query phrase extraction may include keyword extraction (leveraging the syntactic structure of the utterance to identify the important noun phrases and then ranking), action (intent) extraction (exploiting the semantic features of the sentences via semantic role labeling using a constituency-based parse tree to identify agents and actions), and topic label extraction (clustering conversations in a corpus to identify topics). Any emotional content still present in the query phrases is filtered out 110. This filtering can be modeled as a sequence tagging problem where the objective is to identify the emotional phrases from the utterance. The process considers whether any prior user conversations exist that might provide a context for the current utterance 112. If there are no prior conversations, the modified query is submitted to any information retrieval system as is 114. If there are prior conversations, the query undergoes contextual enrichment 116. The enriched query is then submitted to the information retrieval system, and the resulting documents are providing to the agent in real-time during the ongoing conversation 118.

Figure 6:
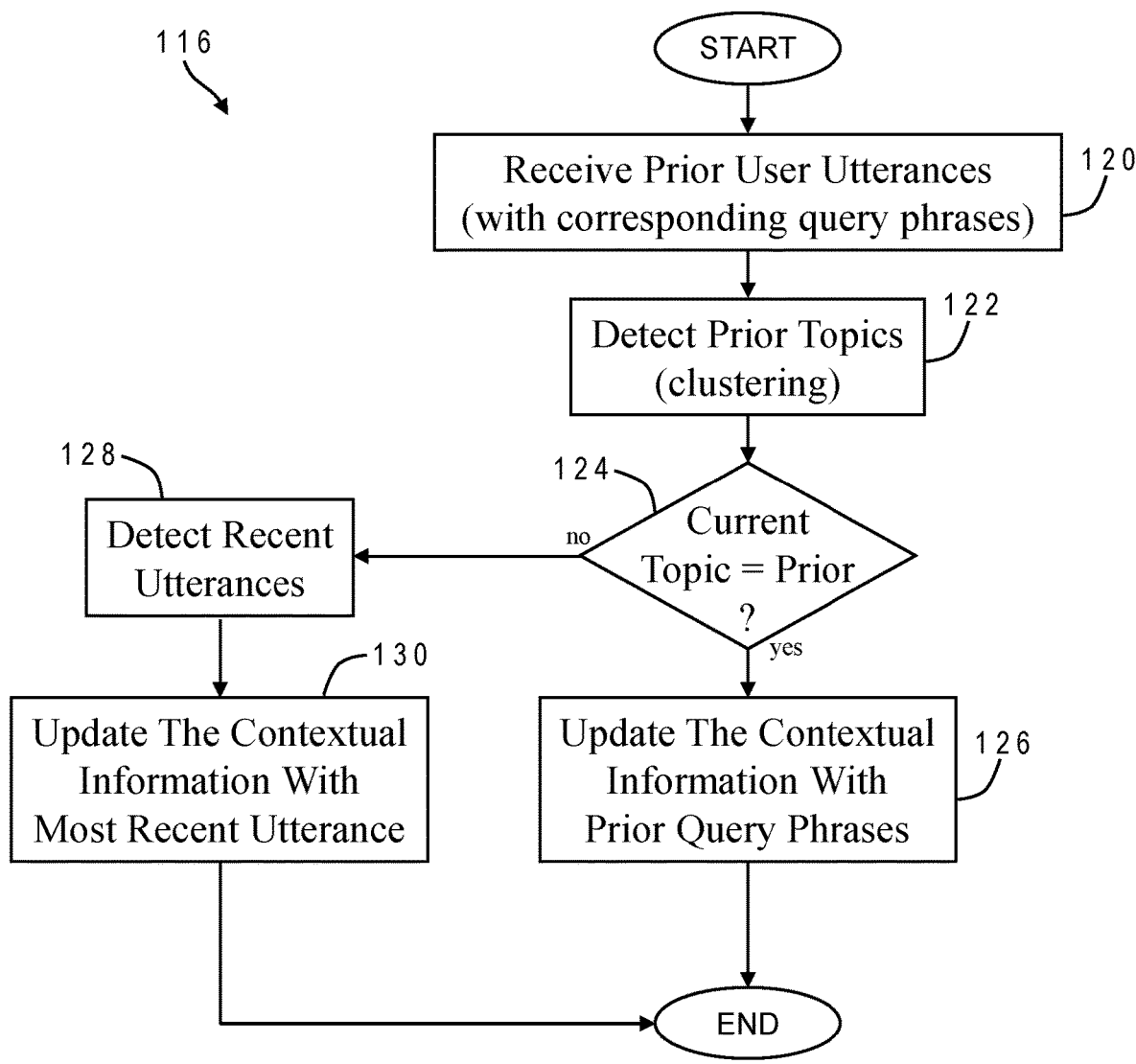
FIG. 6 is a chart depicting the logical flow for the contextual enrichment phase of the enhanced document retrieval process of FIG. 5 in accordance with one implementation of the present invention.

An exemplary manner of performing the contextual enrichment 116 is seen in FIG. 6. The enhanced query modification system first receives a record of all of the prior conversations with this user 120, along with previous query phrases which have been respectively associated with these conversations. The prior conversations undergo clustering using NLP to detect predominant topics 122. This topic clustering may be the same technique used in the earlier query extraction 108 of FIG. 5. A given topic cluster may have only one conversation. Once the prior topics have been determined, different approaches can be used to formulate the contextual information depending on designer preferences. In this implementation, there are three possible scenarios: matching topic, no matching topic but a recent conversation, and no matching topic with no recent conversation. Contextual enrichment process 116 first checks to see if the topic of the current conversation matches any of the prior topics 124. If so, the contextual information becomes the query phrase(s) associated with the conversation(s) in the matching topic cluster 126. If not (or if there is no topic found for the current conversation as part of the keyword extraction), recent utterances of the user are detected 128. Different metrics can be used to decide whether a conversation was recent, such as a predetermined time period or more complicated formulas based on characteristics associated with the user (e.g., whether this user frequently initiates agent conversations). The process assumes that the topic of the recent utterance is still a topic of the current conversation, so the contextual information becomes the query phrase(s) associated with the most recent utterance 130. The contextual information is then combined with the other query phrases as described in conjunction with FIG. 5. In this manner, the present invention provides a superior method of assisting agents in answering the customer's questions in real time.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the invention has been described in the context of a human agent assisting a customer, but the agent could be an artificial intelligence entity like a chatbot, that uses a separate cognitive system to formulate query responses, and the invention is used to produce one or more documents that become the reference corpora for that cognitive system. It is therefore contemplated that such modifications can be made without departing from the spirit or scope of the present invention as defined in the appended claims.

What is claimed is:

1. A method of enhanced document retrieval for an agent in a real-time conversation with a customer comprising:
receiving a plurality of customer utterances from the customer during the real-time conversation;
extracting content phrases from the customer utterances;
determining contextual information related to a current context of the real-time conversation by identifying one or more query phrases associated with an earlier conversation between the agent and the customer;
combining the contextual information with the content phrases to create a contextually-enhanced content-based query;
submitting the contextually-enhanced content-based query to an information retrieval system; and
providing one or more documents from the information retrieval system to the agent responsive to the contextually-enhanced content-based query.

2. The method of claim 1, further comprising:
identifying emotional content in the content phrases using a sequence tagging model; and
updating the content phrases by removing the emotional content.

3. The method of claim 1 wherein the customer utterances are classified as either informational phrases or non-informational phrases using a cognitive system trained with phrases from prior conversations of multiple users.

4. The method of claim 3 wherein at least some of the content phrases are extracted using keyword extraction.

5. The method of claim 4 wherein at least some of the content phrases are extracted using intent/action extraction.

6. The method of claim 5 wherein at least some of the content phrases are extracted using topic label extraction.

7. A computer system comprising:
one or more processors which process program instructions;
a memory device connected to said one or more processors; and
program instructions residing in said memory device for carrying out enhanced document retrieval for an agent in a real-time conversation with a customer by
receiving a plurality of customer utterances from the customer during the real-time conversation,
extracting content phrases from the customer utterances,
determining contextual information related to a current context of the real-time conversation by identifying one or more query phrases associated with an earlier conversation between the agent and the customer,
combining the contextual information with the content phrases to create a contextually-enhanced content-based query,
submitting the contextually-enhanced content-based query to an information retrieval system, and
providing one or more documents from the information retrieval system to the agent responsive to the contextually-enhanced content-based query.

8. The computer system of claim 7 wherein said program instructions further identify emotional content in the content phrases using a sequence tagging model, and update the content phrases by removing the emotional content.

9. The computer system of claim 7 wherein the customer utterances are classified as either informational phrases or non-informational phrases using a cognitive system trained with phrases from prior conversations of multiple users.

10. The computer system of claim 9 wherein at least some of the content phrases are extracted using keyword extraction.

11. The computer system of claim 10 wherein at least some of the content phrases are extracted using intent/action extraction.

12. The computer system of claim 11 wherein at least some of the content phrases are extracted using topic label extraction.

13. A computer program product comprising:
one or more computer readable storage media; and
program instructions collectively residing in said one or more computer readable storage media for carrying out enhanced document retrieval for an agent in a real-time conversation with a customer by:
receiving a plurality of customer utterances from the customer during the real-time conversation,
extracting content phrases from the customer utterances,
determining contextual information related to a current context of the real-time conversation by identifying one or more query phrases associated with an earlier conversation between the agent and the customer,
combining the contextual information with the content phrases to create a contextually-enhanced content-based query,
submitting the contextually-enhanced content-based query to an information retrieval system, and
providing one or more documents from the information retrieval system to the agent responsive to the contextually-enhanced content-based query.

14. The computer program product of claim 13 wherein said program instructions further identify emotional content in the content phrases using a sequence tagging model, and update the content phrases by removing the emotional content.

15. The computer program product of claim 13 wherein the customer utterances are classified as either informational phrases or non-informational phrases using a cognitive system trained with phrases from prior conversations of multiple users.

16. The computer program product of claim 15 wherein at least some of the content phrases are extracted using keyword extraction.

17. The computer program product of claim 16 wherein at least some of the content phrases are extracted using intent/action extraction.

18. The computer program product of claim 9 wherein at least some of the content phrases are extracted using topic label extraction.

* * * * *